Nov. 4, 1969
R. E. BUNGER
3,476,352
APPARATUS FOR MAKING LIVESTOCK FEEDING TROUGH
Filed Dec. 8, 1966
2 Sheets-Sheet 1
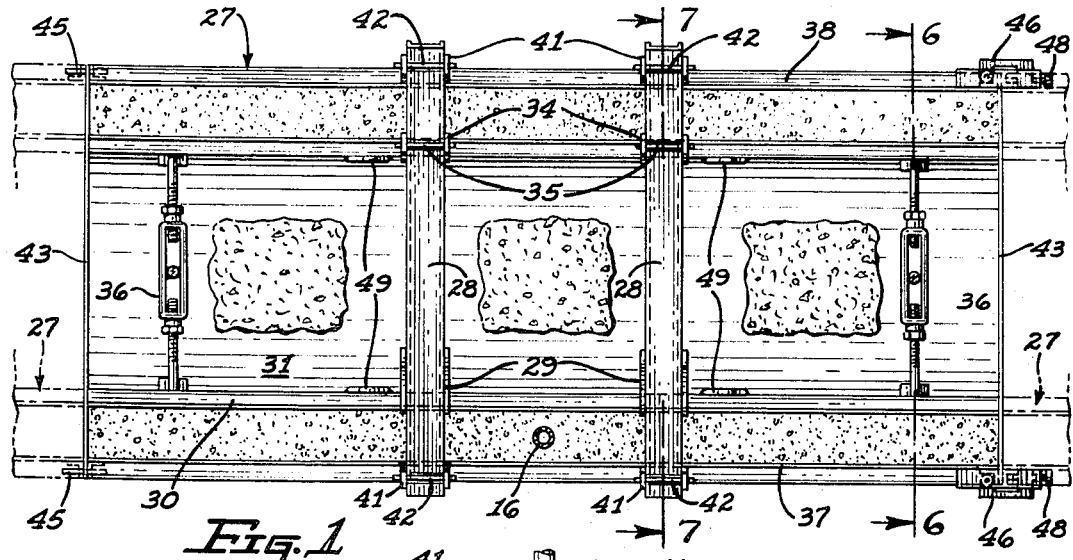
Fig. 1
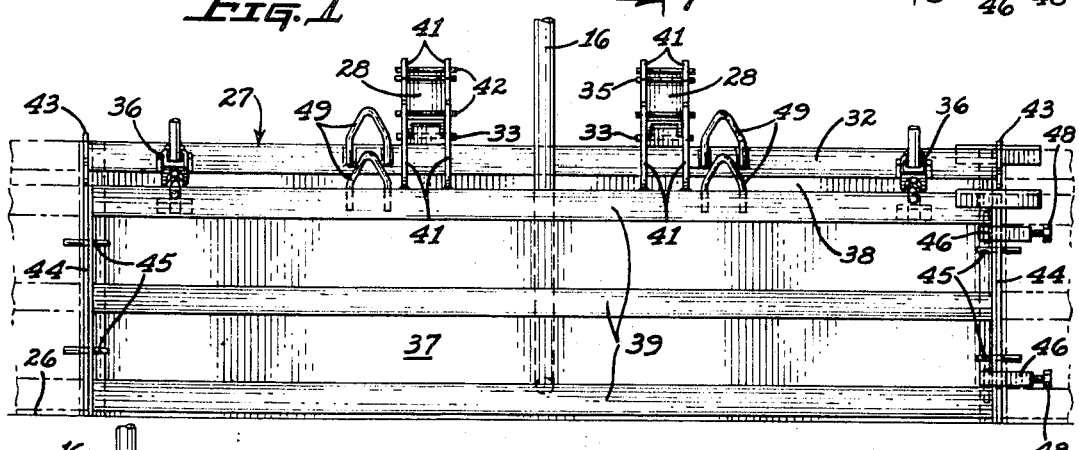
Fig. 2
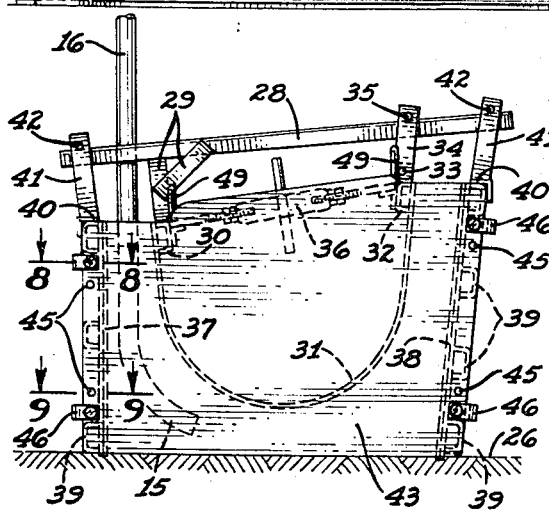
Fig. 3
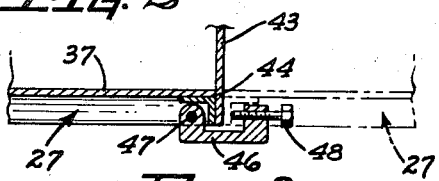
Fig. 8
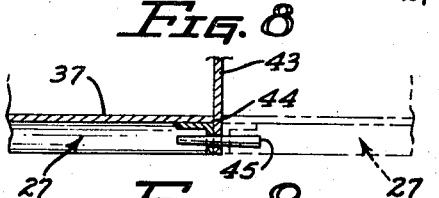
Fig. 9
INVENTOR.
RICHARD E. BUNGER.
BY
Willard S. Growin
ATTORNEY.

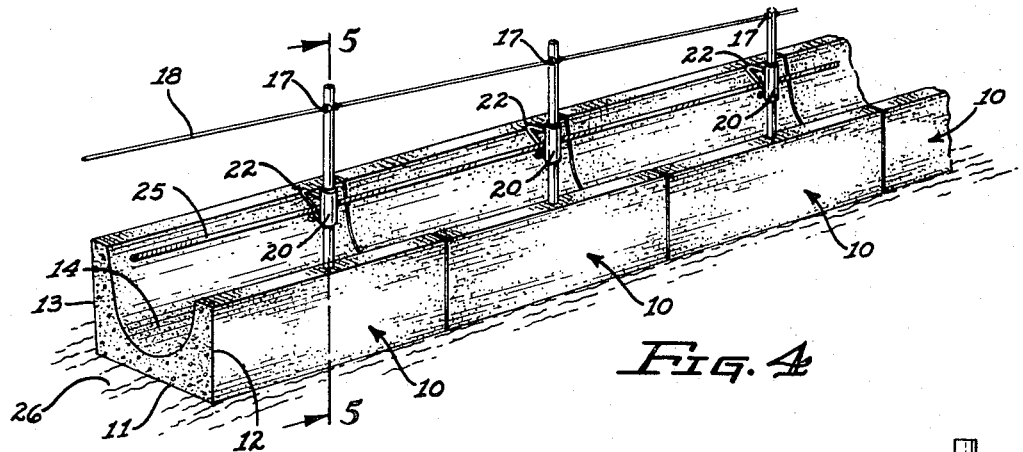
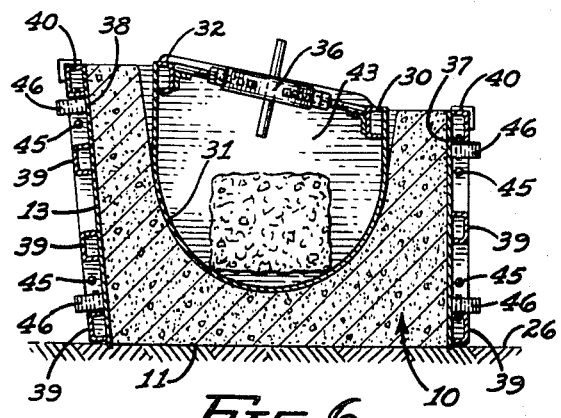
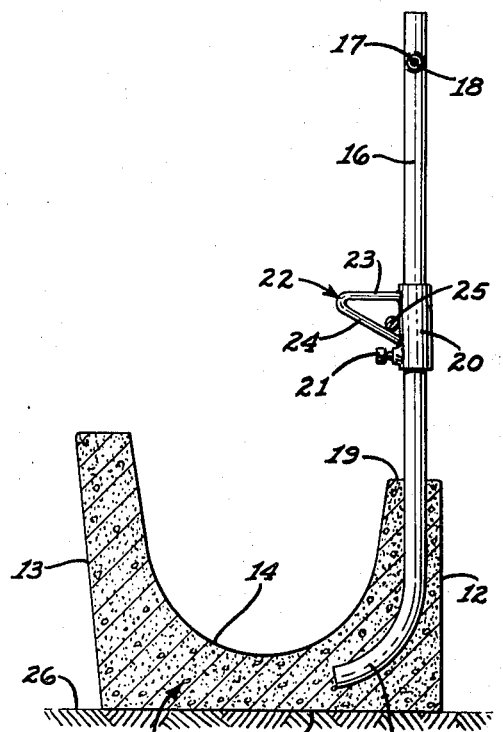
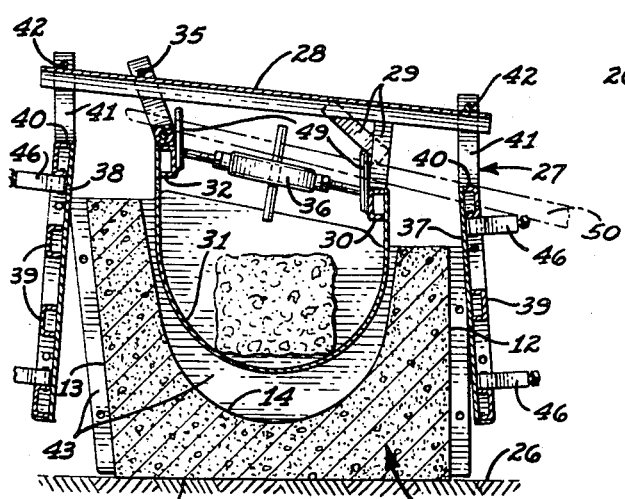

United States Patent Office 3,476,352
Patented Nov. 4, 1969

3,476,352
APPARATUS FOR MAKING LIVESTOCK FEEDING TROUGH
Richard E. Bunger, 5224 E. Washington St., Phoenix, Ariz. 85034
Filed Dec. 8, 1966, Ser. No. 600,131
Int. Cl. B28b 7/30, 7/26
U.S. Cl. 249—146        2 Claims

ABSTRACT OF THE DISCLOSURE

A livestock feeding trough that can be precast at a manufacturing plant location or can be formed in situ at the job site constructed with a portable and collapsible form utilized for the casting and pouring operations, a series of trough sections being poured in longitudinally aligned abutting contact at the desired location at the feed lot. A head and neck control fence structure is incorporated with the cast trough sections to maintain the cattle in proper eating position at the trough.

CROSS REFERENCES TO RELATED APPLICATIONS

There are no cross-references to related applications.

BACKGROUND OF THE INVENTION

Field of the invention

This invention is in the field of livestock feeding apparatus and is particularly directed to apparatus for presenting cattle feed to the animals. More particularly it is directed eo a cast plastic or concrete trough having restraining means to properly position the head of the cattle in eating position relative to the trough. It is also directed to a specially constructed portable and collapsible form for casting such troughs in longitudinal extending abutting contact to form an elongated continuous trough along the edge of the feed lot.

Description of the prior art

Heretofore, it had been necessary, in order to construct a longitudinally extending feed trough along the side of a feed lot, to provide a costly and time-consuming form structure difficult to place at the job and expensive to handle in placement, removal and transporting from job to job. Further, the prior devices and procedures have not been practical with regard to precasting the trough and transporting it from place to place efficiently. The prior troughs also have made it difficult to add to or reduce the length and capacity of the troughs as the dictates of the economics of the cattle feeding operations changed.

SUMMARY

This invention pertains to a livestock feeding trough structure and a specially constructed collapsible and portable form and procedure for constructing the same.

One of the objects is to provide a collapsible form that is easily moved about as by a fork lift so that a longitudinally extending livestock feeeding trough can be readily constructed at low cost in a short time.

Another object is to form a livestock feeding trough by individually and progressively casting a series of longitiudinally aligned segments of the trough in abutting end contact to complete an elongated continuous trough of any required length.

And it is a further object to incorporate within each cast segment a control fence structure to maintain the livestock in proper feeding position relative to the trough at all times.

BRIEF DESCRIPTION OF THE DRAWINGS

FIG. 1 is a plan view of the trough forming apparatus incorporating the features of this invention.

FIG. 2 is a side elevation of the apparatus shown in FIG. 1.

FIG. 3 is an end elevation of the apparatus shown in FIGS. 1 and 2.

FIG. 4 is a fragmentary perspective view of the livestock feeding trough formed by the apparatus of FIGS. 1, 2 and 3.

FIG. 5 is an enlarged sectional view on the line 5—5 of FIG. 4.

FIG. 6 is an enlarged sectional view on the line 6—6 of FIG. 1.

FIG. 7 is a sectional view similar to FIG. 6 but showing the form in collapsed removable condition.

FIG. 8 is an enlarged fragmentary sectional view on the line 8—8 of FIG. 3.

FIG. 9 is an enlarged fragmentary sectional view on the line 9—9 of FIG. 3.

DESCRIPTION OF THE PREFERRED EMBODIMENT

As an example of one preferred embodiment of this invention, there is shown a livestock feeding trough, FIGS. 4 and 5, comprising a series of cast or poured segments 10 preferably formed of concrete having a bottom 11, the front wall 12 facing the feed pen or stockade, the rear wall 13, and the semi-cylindrical feed holding trough 14. Suitably embedded in the front wall by a turned over portion 15 is the upstanding fence post 16 having a top wire or cable support hole 17 arranged to support a suitable top cable 18. Intermediate the cable 18 and the top 19 of the front wall 11 are mounted vertically adjustable control cable brackets 20 arranged to be vertically positioned and locked to the posts 16 by a suitable lock screw 21. A cable eyelet 22 comprising the upper horizontal member 23 and the sloping lower member 24 is rigidly fixed to and extends inwardly over the trough 14.

A control cable 25 is loosely carried in the eyelets 22 so that it can move forwardly and upwardly as the animal sticks his head under the control cable 25 as the animal goes to the trough 14 to eat. As the animal would tend to pull away back from the trough 14, the cable moves to the lower position shown in FIGS. 4 and 5, to restrain the animal from doing so and keep the animal in proper eating position over the trough to thereby avoid spilling or dragging the feed from the trough by the animal and spilling it on the ground. Suitable end posts, not shown, are utilized to maintain proper tension in the cables 18 and 25.

The trough segments 10 are precast on a pallet at a manufacturing plant or are preferably cast on a level ground surface 26 at the job location by a novel and unique self-contained portable collapsible form 27 comprising a pair of longitudinally spaced lateral tie bars 28 each having depending brackets 29 rigidly secured thereto which are fixed at their lower ends to edge rail 30 of the collapsible trough forming member 31. The other edge rail 32 of the trough forming member 31 is pivotally connected by a pin 33 to the lower end of a link 34 in turn pivotally mounted on a pin 35 suitably fixed as by welding to the tie bars 28. Turnbuckles 36 are connected between the edge rails 30 and 32 for moving these members to or from each other for releasing the trough forming member 31 from the cast segment 10.

Front and rear wall forming plates 37 and 38 having suitable integral supporting framework members 39 are fixed at their top edges 40 to the lower ends of the depending links 41 pivotally mounted on suitable pins 42 rigidly fixed to the outer ends of the tie bars 28.

Thin end plates 43 abut against the end surfaces 44, FIGS. 2 and 3, of the front and rear wall forming plates 37 and 38. Suitable demountable dowel pins 45 accurately and positively locate the end plates with the plates 37 and 38 so as to position these plates in pouring position, FIG. 3. Suitable pivoted C-clamps 46 carried on pivot pins 47 on the wall forming plates 37 and 38, FIG. 8, are swung to clamping position shown and the clamp bolts 48 tightened to secure the end plates in position. Where two units 10 are abutted together the pins 45 and C-clamps 46 are used in the same manner with an end plate sandwiched in between the ends of the respective front and rear wall forming plates 37 and 38 as shown in broken line in FIGS. 1, 2, 8 and 9. Suitable lifting eyes 49 are fixed to the top of the edge rails 30 and 32 to facilitate manipulation of the form by the forks 50 of a suitable lift truck, not shown.

To pour a livestock trough, one or more of the forms 27 described above are placed on a level ground surface 26 with the end plates 43 attached to position the front and rear wall forming plates, FIGS. 8 and 9. The turnbuckles 36 are opened out to position the trough forming member 31 in pouring position as shown in FIG. 3. Pouring then begins at one end of a row of connected forms so that by the time the last form in the row is reached the first poured form is ready to be removed and added to the other end of the row to continue the pouring operations in a substantially continuous manner. As soon as a form is filled with plastic concrete the fence post 16 is put in position as shown in FIG. 5, the compacted cement holding it in desired position.

As the various pours in each segment 10 set up sufficiently, turnbuckles 36 are tightened, FIG. 6, to release the trough forming member 31 from the concrete. The C-clamps 46 and pins 45 are removed and the front and rear wall forming plates swing outwardly about pins 42 as shown in FIG. 7. Fork lift 50 is then inserted in the lifting eyes 49 and the entire form 27 is lifted upwardly clear of the poured segment 10, and moved to the next casting position. The end plates 43 left on the end and between the poured segments 10 are then slipped from between them forming the desired expansion joints between the segments. These joints may be left open for liquid drainage or may be caulked with expansion joint compound as required.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

I claim:

1. A self-contained portable collapsible form for precasting a livestock feeding trough on a horizontal surface comprising in combination:
(A) a pair of longitudinally spaced lateral tie bars,
(B) depending brackets rigidly secured to the tie bars,
(C) a collapsible trough forming member having one edge rail fixed to the lower ends of the depending brackets,
(D) a second edge rail on the collapsible trough forming member,
(E) a first set of links pivotally connected to the second edge rail and to the tie bars,
(F) turnbuckles pivotally connected between the edge rails operable to relatively laterally move the edge rails to and from each other for releasing and positioning the trough forming member in the form structure,
(G) a front wall plate,
(H) a rear wall plate,
(I) and a second set of depending links pivotally interconnected between the top edges of the wall plates and the outer ends of the tie bars.

2. A self-contained portable collapsible form as in claim 1 wherein:
(A) thin end plates abut against the end surfaces of the front and rear wall plates,
(B) dowel pins for laterally accurately and positively locating the end plates front and rear wall plates so as to position these plates in pouring position,
(C) and pivoted C-clamps pivotally mounted on the wall plates arranged to swing over the ends of the wall plates to demountably secure the end plates in pouring position.

References Cited
UNITED STATES PATENTS

| | | | |
|---|---|---|---|
| 353,500 | 11/1886 | Ransome | 249—179 X |
| 783,767 | 2/1905 | Wennberg | 249—10 X |
| 1,261,214 | 4/1918 | Clay. | |
| 1,294,366 | 2/1919 | Louden. | |
| 1,328,970 | 1/1920 | Shadron. | |
| 1,338,077 | 4/1920 | Hector | 119—61 |
| 1,670,917 | 5/1928 | Webb et al. | 249—178 |
| 2,182,808 | 12/1939 | Holz | 249—178 X |
| 2,823,440 | 2/1958 | Schade | 249—117 X |
| 3,006,321 | 10/1961 | Bailey | 119—61 |
| 3,146,510 | 9/1964 | McCall | 249—178 |
| 3,338,546 | 8/1967 | Fuller | 249—178 |

J. SPENCER OVERHOLSER, Primary Examiner

D. W. JONES, Assistant Examiner

U.S. Cl. X.R.

119—61; 249—179